United States Patent [19]

Minoura

[11] 4,209,223
[45] Jun. 24, 1980

[54] SCANNING DEVICE

[75] Inventor: Kazuo Minoura, Yokohama, Japan

[73] Assignee: Canon Kabushiki Kaisha, Tokyo, Japan

[21] Appl. No.: 922,644

[22] Filed: Jul. 7, 1978

Related U.S. Application Data

[63] Continuation-in-part of Ser. No. 830,352, Sep. 2, 1977, abandoned.

[30] Foreign Application Priority Data

Sep. 3, 1976 [JP] Japan ................... 51-105462

[51] Int. Cl.² .............................................. G02B 21/00
[52] U.S. Cl. ....................................... 350/6.1; 350/6.8; 358/199
[58] Field of Search .................... 350/6.6, 6.7, 276 R, 350/175, 6.8; 358/199; 355/3 R

[56] References Cited

U.S. PATENT DOCUMENTS

| | | | |
|---|---|---|---|
| 2,692,369 | 10/1954 | Geiser | 350/6.6 |
| 3,345,120 | 10/1963 | Palmer | 350/6.7 |
| 3,573,849 | 4/1971 | Herrcot | 350/7 |
| 3,885,857 | 5/1975 | Flogaus et al. | 350/7 |

FOREIGN PATENT DOCUMENTS 1393535  5/1975  United Kingdom ............. 350/6.6

Primary Examiner—John K. Corbin
Assistant Examiner—B. W. de los Reyes
Attorney, Agent, or Firm—Fitzpatrick, Cella, Harper & Scinto

[57] ABSTRACT

This specification discloses a scanning device which is capable of providing a light spot moving at a uniform velocity on a surface to be scanned. The scanning device has a light source, an optical system for receiving the beam from the light source and direct a stationary beam to a deflector for collimating the stationary beam into a scanning parallel beam, and a scanning lens sytem for condensing the scanning parallel beam from the deflector onto the surface to be scanned. The deflector is a transparent polygonal member rotatable about a rotation axis at a constant speed and has a hollow portion whose cross-section orthogonal to the rotation axis is a circle centered at said rotation axis. The optical system causes the stationary beam to impinge at right angles from the rotation axis upon the cylindrical surface formed by the hollow portion. The stationary beam is convergent at the focal line of the cylindrical surface, in the first plane perpendicular to the rotation axis, and is parallel in the second plane perpendicular to the first plane. Thus, the beam emergent from the deflector is parallel both in the first and second planes orthogonal with each other. The scanning lens system has a deflection characteristic expressed as:

$$y' = (n-1) f \arctan\left(\frac{\sin\theta}{n - \cos\theta}\right)$$

where
  y': the distance between an image of the spot and the optical axis of the scanning lens system.
  n: refractive index of the polygonal member,
  f: focal length,
  θ: the angle formed between the scanning parallel beam and the optical axis of said scanning lens system.

Because of such strain characteristic of the scanning lens system, there is obtained a light spot moving at a uniform velocity on the scanned surface.

2 Claims, 6 Drawing Figures

SCANNING DEVICE

BACKGROUND OF THE INVENTION

This is a continuation-in-part application from U.S. Ser. No. 830,352 filed on Sept. 2, 1977 now abandoned.

1. Field of the Invention

This invention relates to a scanning device which can provide a light spot moving at a uniform velocity on a scanned surface, and more particularly to a scanning device using a transparent polygonal member deflector rotatable at a uniform velocity.

Herein, the transparent polygonal member means a member comprising an optical material transparent to at least light of a predetermined wavelength and having a plurality of planar surfaces formed on the outer periphery thereof about a certain axis, and a cylindrical hollow portion formed with said certain axis as the center axis. Further, the transparent polygonal member deflector means a deflector which may be rotated at a uniform angular velocity with said certain axis of the transparent polygonal member as the rotational axis to cause a stationary light beam to impinge from said rotation axis upon the cylindrical surface formed by said hollow portion, thereby providing a scanning parallel light beam.

2. Description of the Prior Art

Scanning devices which can provide a light spot moving at a uniform velocity on a scanned surface have long since been known. The uniformity of the velocity of the light spot has been ensured by an optical system having a deflection characteristic being disposed between the deflector and the scanned surface.

For example, U.S. Pat. No. 2,692,369 issued to K. R. Geiser, particularly FIG. 3 thereof, ensures the uniform velocity movement of the light spot by disposing an optical system having a deflection between a light cam deflector and the scanned surface.

U.S. Pat. No. 3,345,120 issued to Dr. Palmer, particularly lines 1–3 in the fifth column thereof referring to FIG. 6, discloses a scanning device which uses a lens disposed between a rotatable polygonal mirror deflector and the scanned surface to convert a scanning light beam moving at a uniform angular velocity into a light spot moving at a uniform velocity. U.S. Pat. No. 3,573,849 discloses a scanning device which is entirely identical with the scanning device disclosed in said Dr. Palmer's patent. In that Patent, the lens disposed between the rotatable polygonal mirror deflector and the scanned surface is a lens having its focal length F.L. expressed as $K\theta/\tan\theta$, but this expression is merely a formulation of the characteristic of Dr. Palmer's lens system.

There are thus known various scanning devices which can provide a light spot moving at a uniform velocity, whereas no scanning device is known which includes a transparent polygonal member deflector rotatable at a uniform angular velocity and yet provides a light spot moving at a uniform velocity. A light spot moving at a uniform velocity cannot be obtained even if a lens such as the aforementioned K. R. Geiser's lens or Dr. Palmer's lens is disposed between the transparent polygonal member deflector rotatable at a uniform velocity and the scanned surface. The reason is that because K. R. Geiser's deflector is a light cam deflector or Dr. Palmer's deflector is a rotatable polygonal mirror, scanning light beams having intrinsic deflection characteristics are obtained from these deflectors and therefore, the deflection lens systems used in these scanning devices are designed so as to be suited for such intrinsic deflection characteristics.

SUMMARY OF THE INVENTION

It is an object of the present invention to provide a scanning device which includes a transparent polygonal member deflector rotatable at a uniform angular velocity and which can provide a light spot moving at a uniform velocity on a scanned surface.

To achieve such an object, the scanning device of the present invention has a scanning lens system disposed between the transparent polygonal member deflector and the scanned surface, which lens system has a deflection characteristic expressed as:

$$y' = (n - 1)f \arctan\left(\frac{\sin\theta}{n - \cos\theta}\right),$$

where n is the refractive index of the polygonal member, f the focal length of the lens system and $\theta$ the angle formed between the scanning parallel (afocal) beam and the optical axis of the scanning lens system.

The invention will become more fully apparent from the following detailed description thereof taken in conjunction with the accompanying drawings.

DESCRIPTION OF THE PREFERRED EMBODIMENTS

Figure 1:
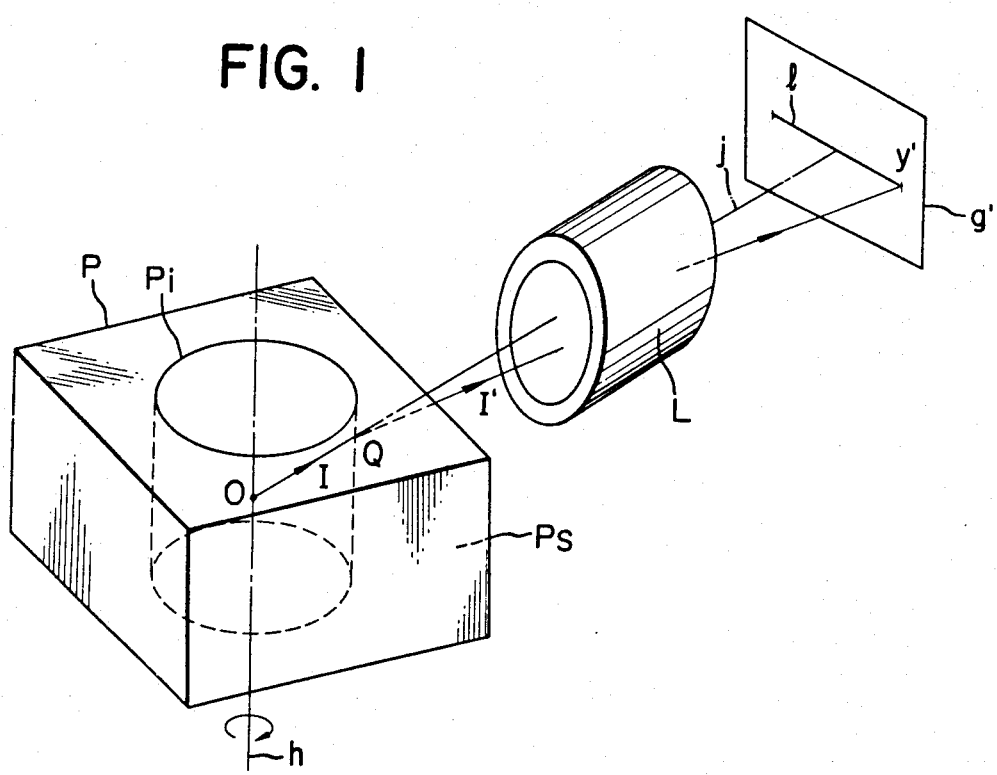
FIG. 1 is a perspective view of the optical arrangement of the scanning optical system which comprises a transmitting type polygonal member and a conventional lens (a lens whose deflection characteristic y' is expressible as $f \tan\theta$).
Figure 2:
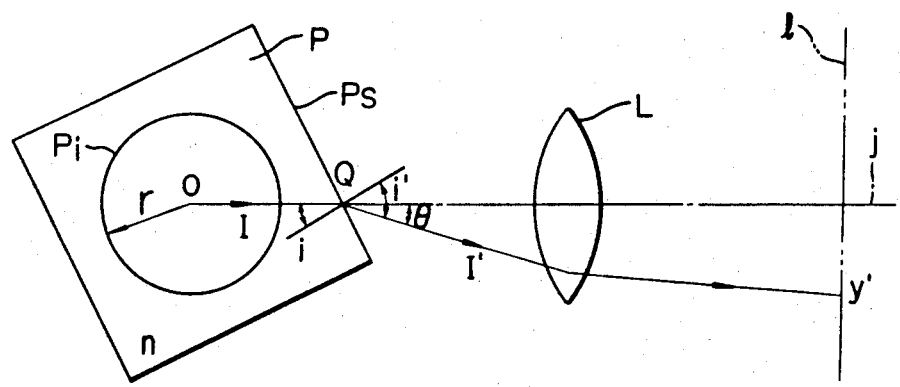
FIG. 2 is a top plan view of the FIG. 1 system.

Before an embodiment of the present invention is described, reference is first had to FIGS. 1 and 2 to describe an arrangement in which a conventional lens, namely, a lens having a deflection characteristic expressible as $y' = f \tan\theta$, where y' is the distance between an image of the spot and the optical axis of the scanning lens system. In FIGS. 1 and 2, which are a perspective view and a top plan view, respectively, of the optical arrangement of the scanning system, P designates a square post-shaped polygonal member formed of glass or like transparent material. The polygonal member has therein a hollow portion of circular cross-section which is shown as a cylindrically shaped hollow portion. The polygonal member P is rotatable about the center axis h of the cylindrically shaped hollow portion at a uniform velocity. Stationary beam I from a point O on the center axis h passes through the cylindrical surface Pi of the polygonal member at right angles therewith and further through the outer flate surface Ps of the polygonal member and enters a condenser lens L in the form of a deflected parallel beam I'.

In order to obtain such a parallel beam deflected, the beam incident on the cylindrical surface Pi has to be converging at a focal line of the cylindrical surface Pi in a plane perpendicular to the rotation axis h, and also to be parallel in the plane perpendicular to the last-mentioned plane. By the lens L, the beam I' is then focused at a point on a horizontal scanning line l on a scanned surface g. Thus, the scanning spot light moves on the horizontal scanning line l. The point O, the optic axis J of the lens L and the horizontal scanning line l all lie on the same plane and the light from the point O moves along this plane. In such an arrangement, assume that the angle of rotation i=O, that the deflected parallel beam I' is coincident with the optic axis J, that the angle of deflection of the parallel beam I' is $\theta$, that the angle of refraction on the surface Ps of the polygonal member P is i', and that the refraction index of the polygonal member is n. Then, the following expression is written:

$$n \sin i = \sin i' \qquad (1)$$

Accordingly, the following is obtained:

$$\text{angle of refraction } (i') = \arcsin (n \sin I) \qquad (2)$$

On the other hand, from FIG. 2, the angle of deflection $\theta$ with respect to the optic axis j is:

$$\theta = i' - i \qquad (3)$$

Hence, from equations (2) and (3), the following is obtained:

$$\theta = -i + \arcsin (n \sin I) \qquad (4)$$

By differentiating equation (4), the rate of variation of the deflection beam with respect to the polygonal member which effects uniform velocity rotation is derived:

$$\frac{d\theta}{di} = -1 + \frac{n \cos i}{\sqrt{1 - (n \sin i)^2}} \qquad (5)$$

If such a deflected beam is focused by a conventional lens, namely, a lens in which the image height y'=f tan $\theta$, where f is represented by the paraxial focal length of the lens, then the position of the scanning spot y' on the scanning line l is obtained from equations (4) and (5):

$$\frac{dy'}{di} = f \cdot \frac{1}{\cos^2 \theta} \cdot \frac{d\theta}{di} = f \cdot \frac{1}{\cos^2 \{-i + \arcsin (n \sin i)\}} \left( -1 + \frac{n \cos i}{\sqrt{1 - (n \sin i)^2}} \right)$$

As is apparent from this equation, the movement velocity of the spot y' is non-linear.

Therefore, making this non-linear movement into a linear movement may be accomplished by providing the condensing optical system with a special deflection characteristic. This deflection characteristic may be obtained in the manner which will hereinafter be described. That is, in order that the movement of the scanning spot may be linear for the angle of rotation i of the polygonal member, the following condition is required:

$$(dy'/di) = K \; (K \text{ is constant}) \qquad (6)$$

From equations (5) and (6), $$\frac{dy'}{d\theta} = \frac{K}{\frac{n \cos i}{\sqrt{1 - (n \sin i)^2}} - 1} \qquad (7)$$

Here, $$\tan i = \sin \theta / (n = \cos \theta) \qquad (8)$$

Hence, develop equation (8) with $\theta$ as infinitesimal, and consider a first approximation thereto to obtain:

$$i = I/(n - I) \qquad (9)$$

Substitute equation (9) for equation (7), and consider a first approximation thereto to obtain:

$$(dy'/d\theta) = K/(n - I). \qquad (10)$$

On the other hand, assuming that the paraxial focal length of the lens is f, $$(dy'/d\theta) = f \qquad (11)$$

Hence, from equation (10) and (11), $$K = (n - I)f \qquad (12)$$

Substitute equation (12) for equation (6) to obtain:

$$(dy'/di) = (n - I)f$$

$$y' = (n - I)f \cdot i \qquad (13)$$

Here, from equation (8), $$i = \arctan \left( \frac{\sin \theta}{n - \cos \theta} \right) \qquad (14)$$

Hence, the following is obtained:

$$y' = (n - 1)f \arctan \left( \frac{\sin \theta}{n - \cos \theta} \right) \qquad (15)$$

By providing the focusing lens L with the deflection characteristic as expressed by equation (15), the scanning spot becomes linearly movable.

Figure 3:
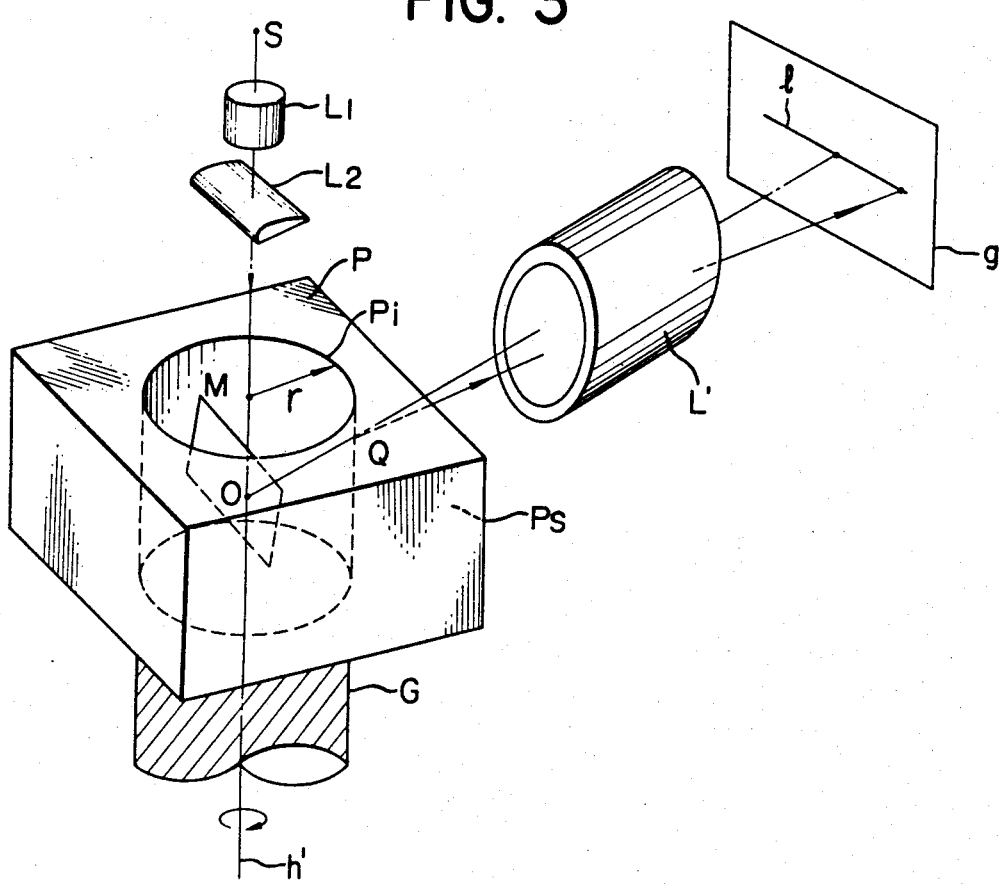
FIG. 3 shows the optical arrangement of an embodiment of the present invention.
Figure 5:
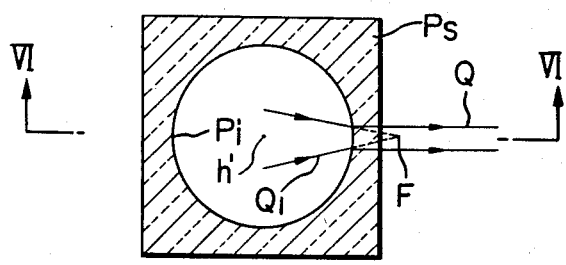
FIG. 5 is a cross-sectional top view of FIG. 3 system showing the function of the cylindrical surface.

Reference will hereinafter be had to FIG. 3 to describe a scanning optical system to which the present invention is applied. In FIG. 3 which shows the optical arrangement of an embodiment of the present invention, S designates a light source disposed on the rotation axis h, L1 denotes a spherical lens for collimating the beam from the light source S, and L2 designates a cylindrical lens. The cylindrical lens L2 is for causing the cylindrically curved surface Pi to emerge a beam which is parallel in one direction and converging in another direction. M is a 45° mirror. This will be explained in detail in conjunction with FIGS. 5 and 6. FIG. 5 is a cross-sectional top elevation, perpendicular to the rotation axis h'. The mirror is eliminated for the sake of simplify. The beam Q1 from the 45° mirror M is convergent at the focal line F of the cylindrical surface Pi, in the plane perpendicular to the rotational axis h'. The beam Q1 is, therefore, collimated into a parallel beam Q. The focal line F is a line parallel to the axis of the cylindrical surface, that is, parallel to the generating line of the cylindrical surface, and passing through the focal point.

Figure 6:
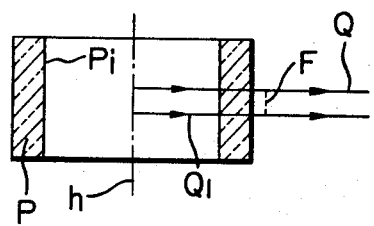
FIG. 6 is a cross-section taken along VI—VI of FIG. 5.

FIG. 6 shows a cross-section taken along lines VI—VI of FIG. 5, that is, perpendicular to the plane of FIG. 5. In this plane, the beam from 45° to mirror M is parallel. Since the cylindrical surface Pi is planer in this plane, the parallel beam remains parallel after passing through the surface Pi. Thus, the beam emergent from the deflector is parallel in both of the planes. L' is a lens having the deflection characteristic as expressed by equation (15). The other members are entirely the same as those in FIG. 1. With such an optical arrangement, the scanning spot light is linearly moved along the horizontal scanning line l on the scanned surface and with respect to the angle of rotation of the polygonal member which effects uniform velocity rotation.

The lens having the deflection characteristic as expressed by equation (15) has the following values of third and fifth distortion coefficients V and V̇ in the fifth aberration range:

$$V = \frac{n}{n-1}$$

$$\dot{V} = -\left(2(\frac{1}{n-1})^2 + 5(\frac{1}{n-1}) + 3\right)$$

Figure 4:
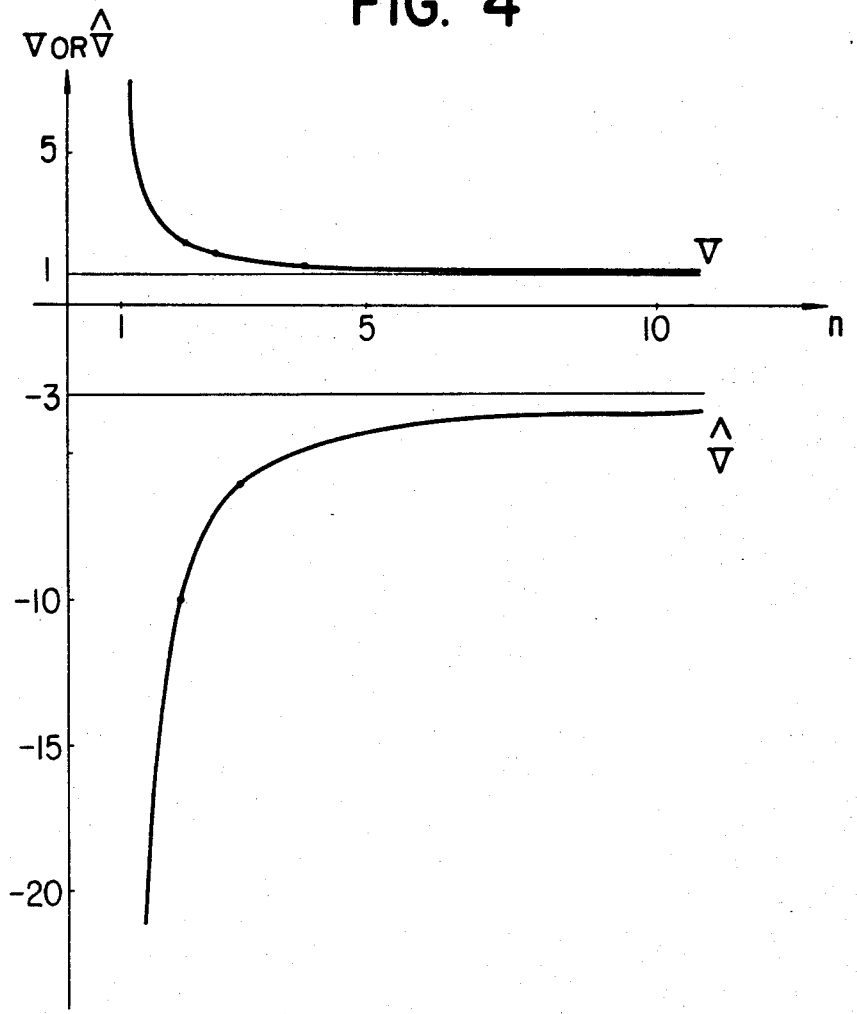
FIG. 4 is a graph illustrating the distortion coefficient of the condensing optical system used with the scanning system of the present invention.

There may be depicted as shown in FIG. 4. The light source S and the lens L1 may be replaced by a laser beam.

What I claim is:

1. A scanning device capable of providing a light spot moving at a uniform velocity on a surface to be scanned, comprising:

a polygonal member deflector rotatable about a rotation axis at a constant speed, said polygonal member deflector having a transparent polygonal body provided with a cylindrical hollow portion having said rotation axis as its center axis;

a light source;

an optical system for receiving a beam from said light source and directing the beam, which is stationary, from said center axis to a cylindrical surface formed by cylindrical hollow portion perpendicularly to the cylindrical surface, the stationary beam being convergent at a focal line of the cylindrical surface in a first plane which is perpendicular to the center axis, and being afocal in a second plane perpendicular to the first plane so that an afocal parallel beam is provided from said deflector;

a scanning optical system disposed between said polygonal member deflector and said surface, said scanning optical system has a deflection characteristic being expressed as:

$$y' = (n-1)f\arctan\left(\frac{\sin\theta}{n-\cos\theta}\right)$$

where
  y': the distance between an image of the spot and the optical axis of the scanning lens system,
  n: refractive index of the polygonal member,
  f: focal length,
  $\theta$: angle formed between the scanning parallel beam and the optical axis of said scanning lens system.

2. A device according to claim 1, wherein said optical system includes a cylindrical lens and a mirror inclined by 45° with respect to said rotation axis.

* * * * *

UNITED STATES PATENT AND TRADEMARK OFFICE
CERTIFICATE OF CORRECTION

PATENT NO. : 4,209,223
DATED : June 24, 1980
INVENTOR(S) : KAZUO MINOURA

It is certified that error appears in the above-identified patent and that said Letters Patent are hereby corrected as shown below:

Column 2, line 68, change "flate" to --flat--.

Column 3, line 19, change "refraction" to --refractive--.

Column 4, line 11, change "(n = cos θ)" to --n - cos θ--.

Column 5, line 7, delete "to".

Signed and Sealed this

Twenty-eighth Day of October 1980

[SEAL]

Attest:

SIDNEY A. DIAMOND

Attesting Officer

Commissioner of Patents and Trademarks